US006228308B1

United States Patent
Uehara et al.

(10) Patent No.: US 6,228,308 B1
(45) Date of Patent: May 8, 2001

(54) SCREW AND APPARATUS FOR PLASTICIZING FIBER-REINFORCED THERMOPLASTIC RESINS, AND METHOD AND PRODUCT OF MOLDING THE RESINS

(75) Inventors: Kenichi Uehara; Shigeru Takano; Yoshikazu Asano, all of Chiba; Masanori Amano, Fukuoka, all of (JP)

(73) Assignees: Kawasaki Steel Corporation, Hyogo; Hitachi Metals, Ltd., Tokyo, both of (JP)

( * ) Notice: Subject to any disclaimer, the term of this patent is extended or adjusted under 35 U.S.C. 154(b) by 0 days.

(21) Appl. No.: 09/230,087

(22) PCT Filed: May 22, 1998

(86) PCT No.: PCT/JP98/02265

§ 371 Date: Jan. 20, 1999

§ 102(e) Date: Jan. 20, 1999

(87) PCT Pub. No.: WO98/52736

PCT Pub. Date: Nov. 26, 1998

(30) Foreign Application Priority Data

May 22, 1997 (JP) .................................... 9-131919
May 7, 1998 (JP) .................................. 10-124799

(51) Int. Cl.$^7$ .............................. B29C 45/60; B29B 7/42; B29B 5/14
(52) U.S. Cl. ...................... 264/328.17; 264/349; 366/78; 366/88; 425/208; 425/587; 524/81; 524/494
(58) Field of Search ........................ 264/328.17, 328.18, 264/349, 211.21, 211.23; 425/208, 587; 366/78, 88; 524/81, 494

(56) References Cited

U.S. PATENT DOCUMENTS

| | | |
|---|---|---|
| 4,299,792 | 11/1981 | Nunn . |
| 5,591,384 | * 1/1997 | Abrams et al. ................ 264/148 |
| 5,743,471 | * 4/1998 | Ivanov ............................. 366/88 |

FOREIGN PATENT DOCUMENTS

| | | |
|---|---|---|
| 2-292008 | 12/1990 | (JP) . |
| 3-76614 | 4/1991 | (JP) . |
| 5-31775 | 2/1993 | (JP) . |
| 08156055 | 6/1996 | (JP) . |
| 08197597 | 8/1996 | (JP) . |
| 08318561 | 12/1996 | (JP) . |

* cited by examiner

Primary Examiner—Jill L. Heitbrink
(74) Attorney, Agent, or Firm—Akin, Gump, Strauss, Hauer & Feld, L.L.P.

(57) ABSTRACT

A screw adapted for plasticizing a fiber-reinforced thermoplastic resin wherein screw lead (distance of the resin advancement in the direction of the axis per 1 revolution of the screw when it is postulated that the screw channel is 100% filled with the resin) of the screw in its compression section decreases in the direction toward the forward end of the screw. A plasticizing apparatus wherein such screw is mounted. A method for molding a fiber-reinforced thermoplastic resin by using such an apparatus. A molded article produced by such molding method.

In the present invention, shear force of sufficient level can be obtained to avoid the formation of clumps while breakage of the reinforcing fibers is avoided to leave long fibers in the molded article. The resulting molded article has excellent mechanical properties, and such article is quite useful as a material for use in automobile parts and other parts.

6 Claims, 5 Drawing Sheets

SCREW AND APPARATUS FOR PLASTICIZING FIBER-REINFORCED THERMOPLASTIC RESINS, AND METHOD AND PRODUCT OF MOLDING THE RESINS

BACKGROUND OF THE INVENTION

1. Technical Field

This invention relates to a screw which may be used in plasticizing a fiber-reinforced thermoplastic resin, a plasticizing apparatus having such screw mounted thereto, a method for molding a fiber-reinforced thermoplastic resin which has been plasticized by using such plasticizing apparatus, and an article molded from a fiber-reinforced thermoplastic resin by such method.

2. Background of the Invention

Pellets of long fiber-reinforced thermoplastic resins are produced by impregnating a bundle of reinforcing continuous fibers such as glass fibers with a molten resin and cutting the resin-impregnated fibers, and such pellets have the characteristic feature that the pellet contains the reinforcing fiber of the length equal to the pellet.

As a consequence, length of the long fibers remaining in the article produced by injection molding such pellets of fiber-reinforced thermoplastic resin is longer than the length of the fiber remaining in the article molded from a short-fiber-reinforced thermoplastic resin. The article molded from the pellets of fiber-reinforced thermoplastic resin, therefore, exhibits excellent mechanical properties and durability comparable to those of continuous-fiber-reinforced composite, as well as a moldability comparable to that of a short-fiber-reinforced thermoplastic resin.

In the state of the art, plasticization of a long-fiber-reinforced thermoplastic resin is conducted in a plasticizing apparatus having a general-purpose plasticizing screw for an ordinary thermoplastic resin which is not specifically designed for the blending of the reinforcing fiber and under the molding conditions generally used for molding thermoplastic resins. Such plasticization in the conventional apparatus was associated with the problems such as decrease in the length of the reinforcing fiber by breakage during the plasticization, and clumps (which is the state of insufficient opening of the fiber bundle) remaining in the molded article when the shear force was reduced to suppress the reinforcing fiber breakage.

FIGS. 3 and 4 are side views of exemplary conventional plasticizing screws for a thermoplastic resin. In the figures, the numeral 1 represents the screw; Sf represents feed section where the resin is heated and conveyed; Sc represents compression section where the heated resin conveyed from the feed section Sf is melted and kneaded; Sm represents metering section where the molten kneaded resin conveyed from the compression section Sc is conveyed to nozzle 6; Lf represents screw lead length of the feed section Sf; $Lc_1$, $Lc_2$ and $Lc_i$ represent first, second, and the i-th screw lead lengths of the compression section Sc; Lm represents screw lead length of the metering section Sm; Hf represents screw channel depth of the feed section Sf; Hm represents screw channel depth of the metering section Sm; Wf represents width of the screw channel of the feed section Sf; $Wc_i$ represents width of the screw channel of the compression section Sc; Wm represents width of the screw channel of the metering section Sm; and D represents screw diameter.

The feed section Sf is the section where the material fed from the hopper 7 is conveyed in forward direction while the material is preliminarily heated before conveying into the subsequent compression section Sc. The compression section Sc is the section where the resin melts by the shearing action in combination with the externally applied heat and where resin pressure is generated to convey the thus molten resin to the subsequent metering section Sm. The metering section Sm is the section where the molten resin is further kneaded for complete uniformity.

The screw lead length is the distance of resin advancement in axial direction per 1 revolution of the screw when it is postulated that the screw channel is 100% filled with the resin.

The screw diameter is generally constant along the overall length of the screw from the feed section Sf to the metering section Sm. The relationship of the overall length L of the screw 1 to the screw diameter D, namely, L/D ratio, is generally in the range of 15 to 25. The feed section Sf, the compression section Sc and the metering section Sm are generally of the ratio of the length of screw sections in the range of from 2:1:1 to 3:2:1.

In the conventional screw 1, the feed section Sf has the screw channel depth Hf greater than the screw channel depth Hm of the metering section Sm, and the decrease in the channel cross-sectional area due to such decrease in the channel depth in the forward direction of the screw generates the shear force required for the melting and kneading of the resin.

The screw channel depth is in the range of 0.13 D to 0.18D in the feed section Sf, 0.03D to 0.08D in the metering section Sm, and the compression ratio represented by "screw channel depth Hf of the feed section Sf/screw channel depth Hm of the feed section Sm" is generally in the range of 1.8 to 3.5. When the screw has a larger compression ratio, shear force applied from somewhere around the compression section Sc will be stronger. The screw lead length is in the range of 0.9D to 1.1D, and is constant from the feed section Sf to the metering section Sm.

Next, an apparatus for plasticizing a thermoplastic resin having mounted thereto the plasticizing screw as described above is described.

Thermoplastic resins are generally plasticized in the plasticizing apparatus as shown in FIG. 4, and the plasticized resin is injected into the mold 9a, 9b as shown in FIG. 5 and is molded. In FIGS. 4 and 5, 1 is the screw, 2 is non-return check valve assembly, 3 is screw head, 4 is cylinder, 4a is cylinder head, 5 is heater, 6 is the nozzle, 7 is the hopper, 8 is screw reciprocating drive including the screw rotating device and the hydraulic device, 9a and 9b are the mold, and 10 is cavity.

It has been the findings of the inventors of the present invention that, when a long-fiber-reinforced thermoplastic resin having the fiber length of 9 mm is molded in a plasticizing apparatus having mounted thereto a conventional plasticizing screw generally used for a thermoplastic resin under normal molding conditions, the strong shear force applied by each parts of the screw results in decrease in the length of the fibers remaining in the molded article to the level of about 0.5 mm although clump formation may be suppressed. As a result, mechanical properties of the molded articles were not substantially improved over those of the articles molded from the short-fiber-reinforced thermoplastic resin (fiber length: about 0.3 mm).

In view of such situation, JP-A 2-292008 discloses a method wherein fiber breakage during the plasticization is prevented by designing the screw channels with the screw channel depth of over 5 mm along the full length of the screw. This method was to some extent effective in preventing the decrease in length of the fiber remaining in the molded article. The mechanical properties of the molded article, however, were not substantially improved.

The JP-A 2-292008 also describes the limitation of the ratio L/D of the overall length L to the diameter D of the screw to the range of 7 to 15. Such limitation may have the effect of reducing the period during which the shear force of the screw is applied to the long-fiber-reinforced thermoplastic resin. The overall shear force applied to the long-fiber-reinforced thermoplastic resin, on the other hand, is reduced by such limitation, and clumps are likely to remain in the molded article to invite stress concentration, and hence, reduced strength of the molded article.

An improvement for such susceptibility to clump formation is disclosed in JP-A 8-197597. In JP-A 8-197597, a part such as a kneading disc is provided on the forward end of the metering section in order to decrease the clumps which may remain when the shear force of the screw is insufficient. JP-A 8-197597, however, includes no substantial quantitative description for the length of the fibers remaining in the molded article or the mechanical properties of the molded articles, and the merit achieved by this invention is rather ambiguous. Moreover, this method involves sacrifice of the plasticizing ability, and not all resins can be plasticized by such method, and there is the need for screw-exchange to correspond to the resin type, therefore the method is complicated and undesirable.

As described above, plasticization of the fiber-reinforced thermoplastic resin in a plasticizing apparatus having mounted thereto the plasticizing screw of conventional type had the problem of reduced residual fiber length and insufficient mechanical strength due to the breakage of the reinforcing fibers in the feed section, compression section and metering section while the clump formation could be avoided. On the other hand, the screw wherein shear force had been reduced to prevent the fiber breakage was capable of preventing the fiber breakage. Such screw, however, suffered from the risk of the remaining of the clumps and incapability of resin plasticization due to the reduced plasticization ability.

An object of the present invention is to solve the problems of the prior art as described above, and provide a screw for plasticizing a long fiber-reinforced thermoplastic resin which is capable of preventing both the breakage of the long reinforcing fibers and the clump formation, an apparatus having such screw mounted thereto, a method for molding a long fiber-reinforced thermoplastic resin by using such plasticizing apparatus, and an article molded by such method wherein various mechanical properties have been highly improved by the long reinforcing fibers.

BRIEF SUMMARY OF THE INVENTION

In order to solve the problems as described above, the inventors of the present invention have made an intensive study on the plasticizing screw of a plasticizing apparatus wherein a fiber-reinforced thermoplastic resin is melted and kneaded, and found that the problems as described above can be solved by decreasing the screw lead length $Lc_i$ of the compression section Sc toward the forward end of the screw. The present invention has been completed on the bases of such finding.

Accordingly, the first aspect of the present invention is directed to a screw for plasticizing a fiber-reinforced thermoplastic resin comprising a feed section Sf for heating and conveying the fiber-reinforced thermoplastic resin, a compression section Sc for melting and kneading the heated resin conveyed from the feed section Sf, and a metering section Sm for conveying the melt-kneaded resin conveyed from the compression section Sc to a nozzle 6, characterized in that screw lead length $Lc_i$ of the compression section Sc decreases in the direction toward the forward end of the screw.

In the first invention, the screw lead length $Lc_i$ of the compression section Sc may be decreased in the direction toward the forward end of the screw either stepwisely or gradually. When the screw lead length $Lc_i$ is gradually decreased, the screw lead length $Lc_i$ may be decreased either at a constant gradient, or at changing gradient. It should be noted that, in the description of the present invention, the numerals designating the parts are the same as those used in the above-described FIGS. 3, 4 and 5 unless otherwise noted.

When the shear force is reduced by such screw geometry, the breakage of the reinforcing fibers and the decrease in the residual fiber length can be prevented, and at the same time, remaining of the clumps can be prevented since the fiber breakage is prevented without excessive increase in the screw channel depth. Consequently, the mechanical properties of the molded article can be markedly improved.

Favorable results may be obtained in the first invention when the metering section Sm has a screw lead length Lm shorter than the screw lead length Lf of the feed section Sf, namely, when the following relation [1] is satisfied.

screw lead length Lm of the metering section Sm<screw lead length Lf of the feed section Sf [1]

Even more favorable results may be obtained in the first invention when screw lead length satisfies the following relations [2] and [3], and the ratio of screw channel cross-sectional area Af of the feed section Sf to the screw channel cross-sectional area Am of the metering section Sm satisfies the following relation [4].

0.9 D≦screw lead length Lf of the feed section Sf≦1.1 D [2]

0.4 D≦screw lead length Lm of the metering section Sm<1.1 D [3]

1<[screw channel cross-sectional area Af of the feed section Sf]/ [screw channel cross-sectional area Am of the metering section Sm]≦2.5 [4]

In the above formulae, D is screw diameter; Af is average of the area represented by multiplying screw channel depth Hf of the feed section Sf, by screw channel width Wf of the feed section Sf; and Am is average of the area represented by multiplying screw channel depth Hm of the feed section Sm, by screw channel width Wm of the metering section Sm.

In the first invention, the ratio Lf/Lm of screw lead length Lf of the feed section Sf to the screw lead length Lm of the metering section Sm is preferably in the range of 1.07 to 2.50, and more preferably 1.13 to 1.80.

The screw diameter D is preferably constant throughout its length although the screw may have different diameter at least in some parts of thereof.

The screw lead length Lf and the screw channel depth Hf of the feed section Sf are preferably constant. The screw lead length Lm and the screw channel depth Hm of the metering section Sm are also preferably constant.

When the screw lead length Lf of the feed section Sf and the lead length Lm in the metering section Sm are not constant, Lf and Lm designate averages of such screw lead length, respectively. When the screw channel depth Hf of the feed section Sf and the screw channel depth Hm of the metering section Sm are not constant, Lf and Lm designate averages of such screw lead length, respectively. When the screw channel width Wf of the feed section Sf and the screw channel width Wm of the metering section Sm are not constant, Lf and Lm designate averages of such screw lead length, respectively.

The screw channel depth Hf of the feed section Sf and the screw channel depth Hm of the metering section Sm are preferably in a relation such that Hf≧Hm, and most preferably, such that the ratio Hf/Hm is in the range of 1 to 2.3. When Hf/Hm is less than 1, the weak shear force may result in an insufficient plasticization and clump formation, and the insufficient resin compression will invite bubble inclusion in the molded article. On the otherhand, when Hf/Hm is in excess of 2.3, clump formation will be avoided by the strong shear force while breakage of the reinforcement fiber is likely to take place during the plasticization to result in the shortened residual fiber.

The second aspect of the present invention is directed to an apparatus for plasticizing a fiber-reinforced thermoplastic resin which comprises a screw 1 and a screw head 3, a cylinder 4 and a cylinder head 4a surrounding the screw 1 and the screw head 3, a nozzle 6 attached to the forward end of the cylinder head 4a, a heater 5 mounted at least to the forward end of the cylinder 4, a hopper 7 for feeding the fiber-reinforced thermoplastic resin to the screw 1, and a screw reciprocating drive 8 for rotating the screw and injecting the plasticized thermoplastic resin, and which is characterized in that the screw 1 is the screw for plasticizing the fiber-reinforced thermoplastic resin of the first aspect of the present invention.

The third aspect of the present invention is directed to a method for molding a fiber-reinforced thermoplastic resin characterized in that a fiber-reinforced thermoplastic resin which has been plasticized by the plasticizing apparatus of the second aspect of the present invention is injected into a mold. The fourth aspect of the present invention is directed to an article comprising a fiber-reinforced thermoplastic resin produced by the molding method of the above-described third aspect of the present invention.

DETAILED DESCRIPTION OF THE INVENTION

Next, the present invention is described in further detail by referring to the attached drawings which by no means limit the scope of the present invention.

Figure 1:
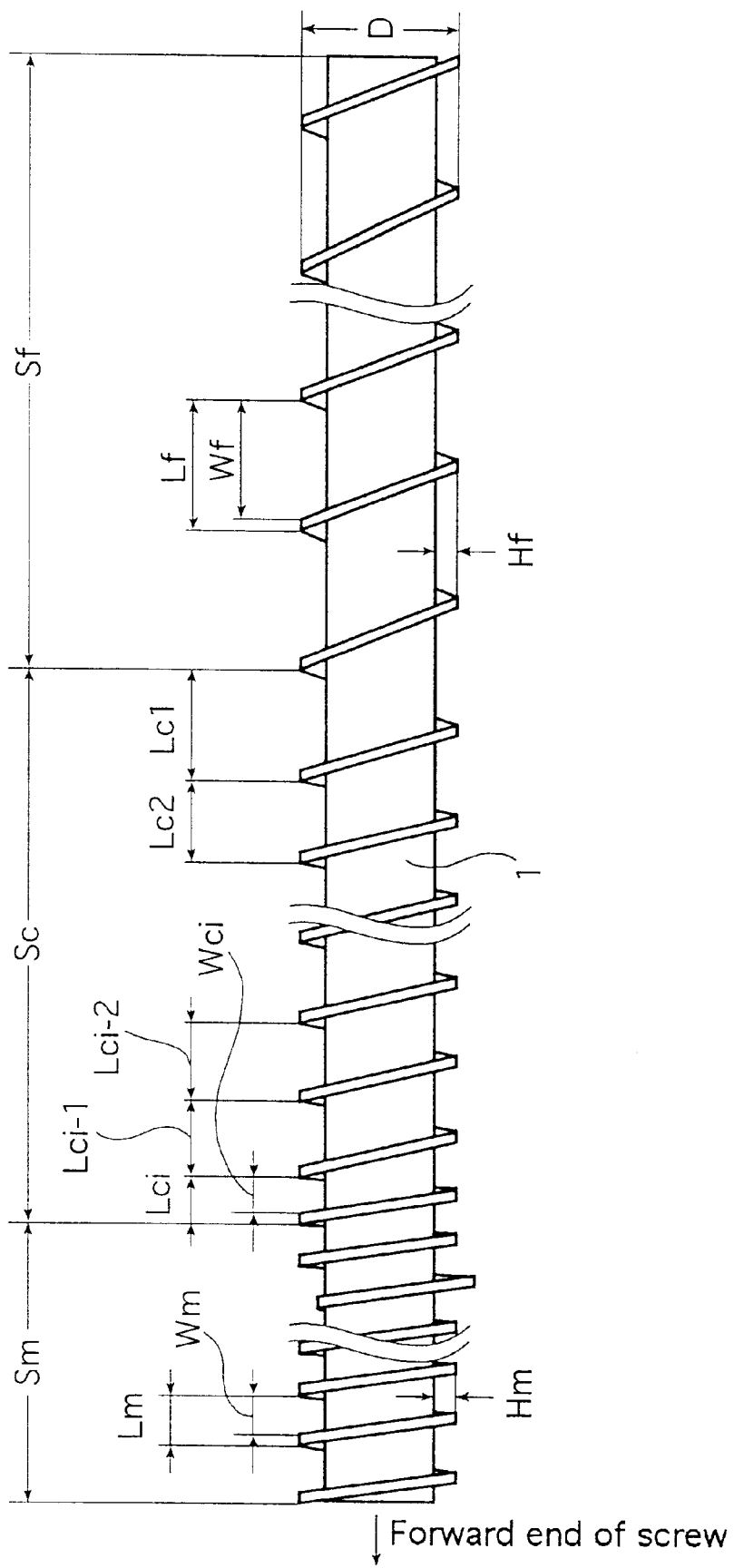
FIG. 1 is a side view of an embodiment of the plasticizing screw for a fiber-reinforced plastic resin according to the present invention.
Figure 2:
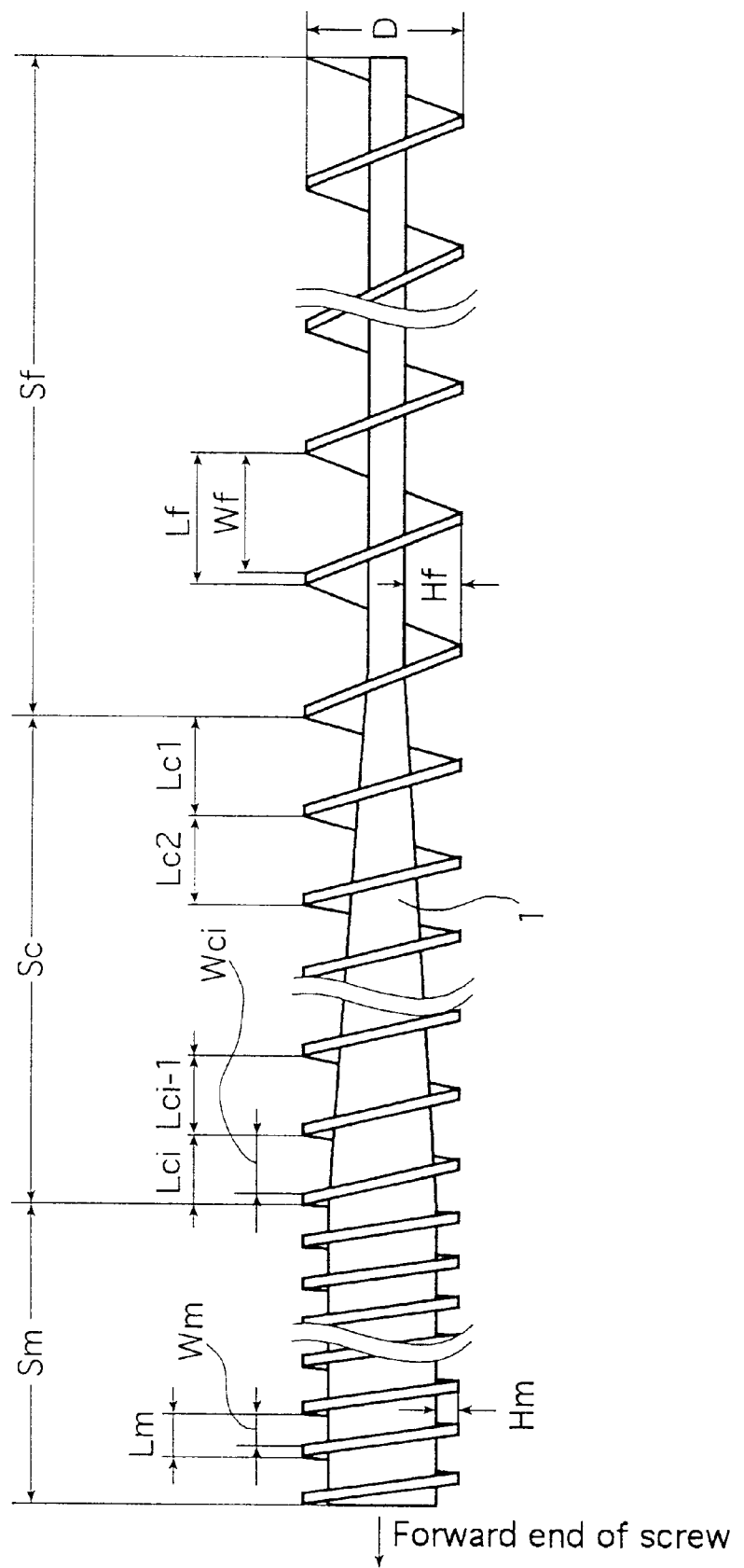
FIG. 2 is a side view of another embodiment of the plasticizing screw for a fiber-reinforced plastic resin according to the present invention.
Figure 3:
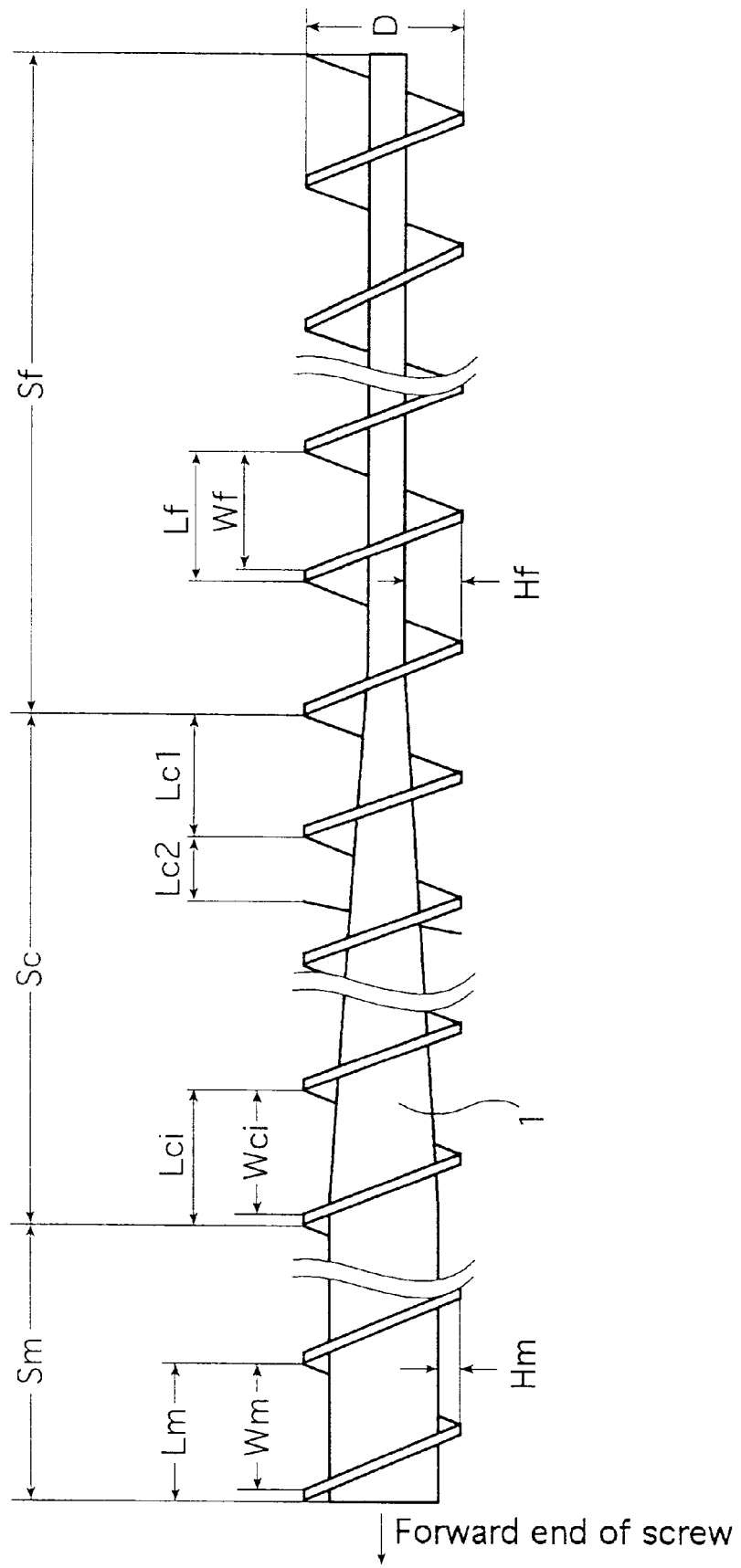
FIG. 3 is a side view of a prior art plasticizing screw.

Difference between the screw geometry of the present invention and the screw geometry of conventional screws is described by referring to FIGS. 1 and 2 which are the views of the screws of the present invention and FIG. 3 which is the view of a conventional screw.

FIGS. 1 and 2 are side views of embodiments of the plasticizing screw for a fiber-reinforced plastic resin according to the present invention, and in these figures, $Lc_i$ designates each screw lead length of the compression section Sc, and other reference symbols are the same as those of FIG. 3. The screw shown in FIG. 1 is the type wherein the screw channel depth is constant along the length of the screw, and the screw shown in FIG. 2 is the type wherein the screw channel depth of the metering section Sm is different from the screw channel depth of the feed section Sf. Both of the screw 1 of FIG. 1 and the screw 1 of FIG. 2 are of the structure wherein the screw lead length $Lc_i$ of the compression section Sc decreases in the direction toward the forward end of the screw. The feed section Sf is constituted from 10 to 16 screw leads, the compression section Sc is constituted from 6 to 10 screw leads, and the metering section Sm is constituted from 5 to 10 screw leads.

In contrast to such screws of the present invention, the screw 1 of the conventional type shown in FIG. 3 has the structure wherein the screw lead length is constant in the axial direction of the screw while the screw channel depth Hc decreases in the compression section Sc toward the forward end of the screw. In the case of the screw with such conventional screw geometry, breakage of the reinforcing fibers can be controlled only when the screw has an extremely large screw channel depth, and such large screw channel depth is likely to result in the remaining of the clumps due to insufficient shear force.

In contrast to such plasticizing screw of conventional geometry, the plasticizing screw of the present invention has the characteristic feature that the screw lead length $Lc_i$ of the compression section Sc decreases toward the forward end of the screw, and a sufficient plasticizing performance is provided by such feature to simultaneously prevent the clump formation and fiber breakage. In addition to such merits, debubbling is promoted to reduce the bubble remaining in the molded article.

The screw lead length $Lc_i$ of the compression section Sc may be reduced either stepwisely or gradually, namely, in stepwise manner from section to section or continuously in a constant gradient. In other words, the screw lead length $Lc_i$ may be reduced so that the screw lead length may satisfy the following relation [8]:

$$Lc_1 \geq Lc_2 \geq Lc_i \geq Lc_{i+1} \geq Lc_{i+2} \ldots \geq Lc_{n-1} \geq Lc_n \qquad [8]$$

when the number of screw leads constituting the compression section Sc is n, the screw lead length $Lc_1$ is the one located nearest to the feed section Sf in the compression section Sc, and the screw lead length $Lc_n$ is the one located nearest to the metering section Sm in the compression section Sc. It is more preferable that the screw 1 of the present invention has the screw lead which satisfies the following relation [1]:

screw lead length Lm of the metering section Sm<screw lead length Lf of the feed section Sf [1]

When the screw lead length Lm of the metering section Sm is equal to or longer than the screw lead length Lf of the feed section Sf, insufficient plasticizing performance will result in the remaining of the clumps and incomplete debubbling will invite bubble remaining in the molded article.

In the present invention, in order to retain the residual fiber length by preventing the breakage of reinforcing fiber, and to suppress the formation of the clump during the plasticization, the ratio Lf/Lm of the screw lead length Lf of the feed section Sf to the screw lead length Lm of the metering section Sm is preferably in the range of 1.07 to 2.50, and more preferably in the range of 1.13 to 1.80. The Lf/Lm in excess of 2.50 is unfavorable since the shear force is too strong, and breakage of the reinforcing fiber during the plasticization will invite decrease of the residual fiber length. The Lf/Lm of less than 1.07 is also undesirable since the shear force is insufficient and the insufficient plasticization is likely to result in the undesirable clump formation.

When the screw channel depth Hm of the metering section Sm is in excess of the screw channel depth Hf of the feed section Sf, plasticization performance will be reduced and clumps are likely to remain in the molded article.

Still more preferable results may be obtained by the screw 1 of the present invention when the screw lead length satisfies the following relations [2] and [3], and ratio of screw channel cross-sectional area Af of the feed section Sf to the screw channel cross-sectional area Am of the metering section Sm satisfies the following relation [4]:

$0.9\ D \leq$ screw lead length Lf of the feed section $Sf \leq 1.1\ D$  [2]

$0.4\ D \leq$ screw lead length Lm of the metering section $Sm \leq 1.1\ D$  [3]

$1 <$ [screw channel cross-sectional area Af of the feed section Sf]/[screw channel cross-sectional area Am of the metering section Sm] $\leq 2.5$  [4]

wherein D is screw diameter; Af is average of the area represented by multiplying screw channel depth Hf of the feed section Sf, by screw channel width Wf of the feed section Sf; and Am is average of the area represented by multiplying screw channel depth Hm of the feed section Sm, by screw channel width Wm of the metering section Sm.

When the screw lead length Lf of the feed section Sf is greater than 1.1D, plasticization performance will be reduced and clumps are likely to remain in the molded article. The screw lead length Lf smaller than 0.9D is also undesirable since the unduly increased shear strength is likely to invite fiber breakage.

When the screw lead length Lm of the metering section Sm is greater than 1.1D, the screw lead length Lm will be longer than the screw lead length Lf of the feed section Sf, and as a consequence, plasticization performance will be reduced and clumps are likely to remain in the molded article. On the other hand, the screw lead length Lf smaller than 0.4D is undesirable since the unduly increased shear strength is likely to invite fiber breakage.

When the ratio of screw channel cross-sectional area Af of the feed section Sf to the screw channel cross-sectional area Am of the metering section Sm is 1 or less, plasticization performance will be reduced and clumps are likely to remain in the molded article. The ratio in excess of 2.5 is also undesirable since the unduly increased shear strength is likely to invite fiber breakage.

The feed section Sf, the compression section Sc, and the metering section Sm of the screw of the present invention are preferably of the length such that the ratio in length of Sf:Sc:Sm is in the range of 2:1:1 to 3:2:1.

The screw may be fabricated from a material which is commonly used in the fabrication of a screw.

Figure 4:
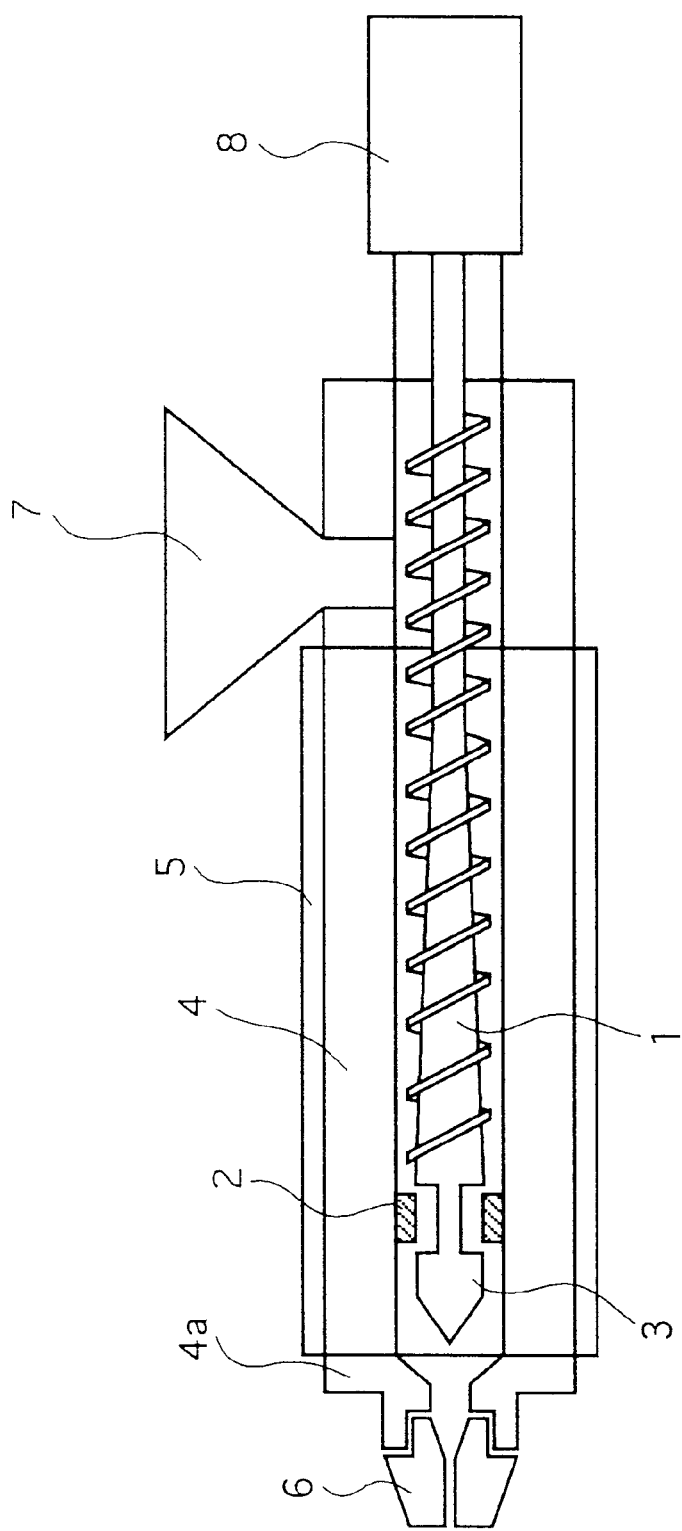
FIG. 4 is a side view of an exemplary plasticizing apparatus.

As shown in FIG. 4, the apparatus for plasticizing a fiber-reinforced thermoplastic resin of the present invention is the plasticizing apparatus which comprises a screw 1 and a screw head 3, a cylinder 4 and a cylinder head 4a surrounding the screw 1 and the screw head 3, a nozzle 6 secured to the forward end of the cylinder head 4a, a heater 5 secured at least to the cylinder 4, a hopper for feeding the fiber-reinforced thermoplastic resin to the screw 1, and a screw reciprocating drive 8 for rotating the screw and injecting the plasticized thermoplastic resin, and the apparatus has mounted thereto the screw 1 of the present invention as described above.

The difference between the internal diameter of the cylinder 4 and the screw diameter D, namely, the clearance may be the same as those of the ordinary plasticizing apparatus, and the preferable range is 1/1000 to 1/100 of the diameter D. A non-return check valve assembly 2 is preferably provided between the screw 1 and the screw head 3. Exemplary non-return check valve assemblies include a check ring, a ball check, and the like.

Figure 5:
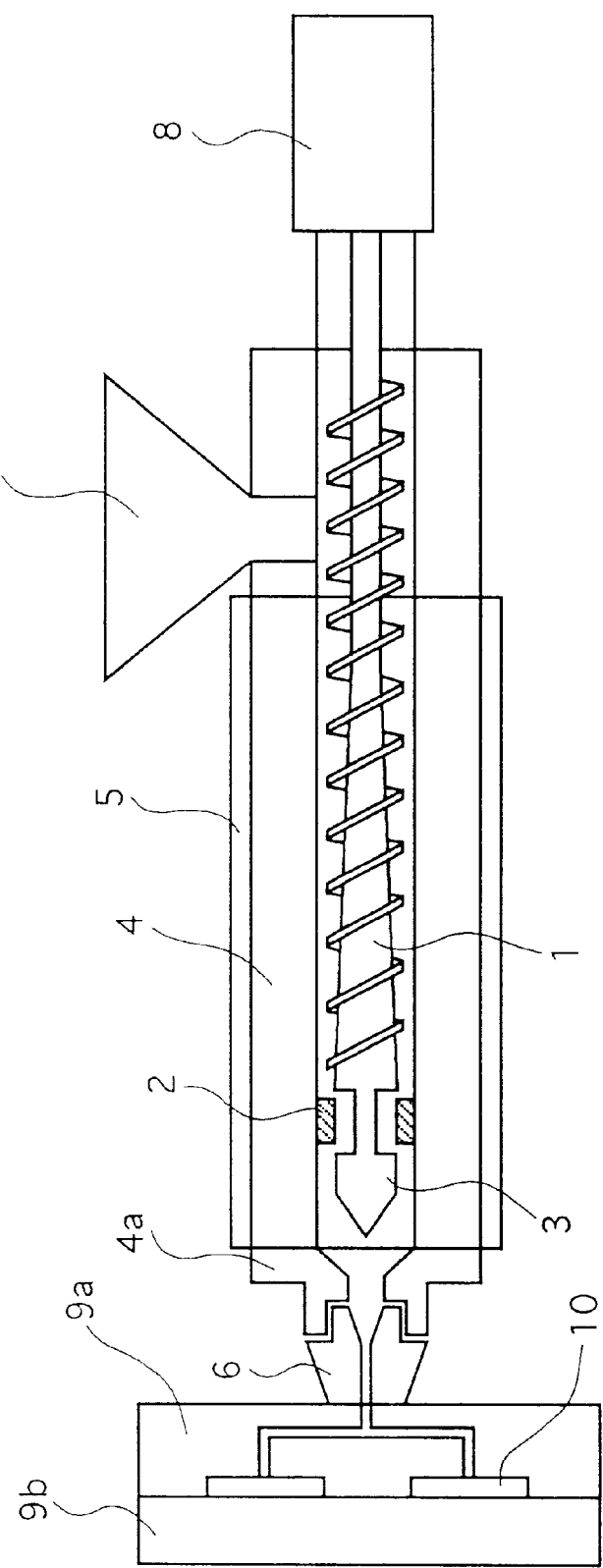
FIG. 5 is a side view of an exemplary injection molding machine.

As shown in FIG. 5, the method for molding a fiber-reinforced thermoplastic resin of the present invention is the method wherein a fiber-reinforced thermoplastic resin which has been plasticized by the plasticizing apparatus of the present invention as described above is injected into a mold 9a, 9b to thereby mold an article. The mold used in the present invention may have any desired mold specification including the mold structure.

The long-fiber-reinforced thermoplastic resin may be prepared, for example, by impregnating a bundle of reinforcing continuous fibers with the resin and cutting the fibers into pellets. The impregnation method may be accomplished by any desired procedure including the following exemplary methods.

(1) a method wherein the bundle of reinforcing continuous fibers is impregnated with an emulsion of the thermoplastic resin, followed by drying;

(2) a method wherein the bundle of reinforcing continuous fibers is coated with a suspension of the thermoplastic resin, and impregnated with a molten resin by heating after drying;

(3) a method wherein the bundle of reinforcing continuous fibers is electrically charged to adhere the thermoplastic resin in powder form, and impregnated with a molten resin by heating;

(4) a method wherein the bundle of reinforcing continuous fibers is impregnated with a solution of the thermoplastic resin in a solvent, and the solvent is thereafter removed;

(5) a method wherein a fiber mixture of thermoplastic resin continuous fibers and reinforcing continuous fibers is heated to thereby impregnate the molten thermoplastic resin in the reinforcing continuous fibers; and (6) a method wherein the bundle of reinforcing continuous fibers is impregnated with a thermoplastic resin by drawing the bundle on a bar, a roll or a die while opening.

Among the methods as described above, the method (6) is most suitable in view of the simplicity of the installation and the process.

The bundle of reinforcing continuous fibers, namely, the so called resin strand having the resin impregnated therewith obtained by the method as described above is cooled, then cut into the pellets of desired length. The resulting pellets includes the reinforcing fibers of the length equal to the pellets which are aligned in parallel.

The pellets of the long-fiber-reinforced thermoplastic resin suitable for use in the present invention may have any desired shape, and the cross-sectional shape of the pellets may be round, oval, square, or the like. Aspect ratio (ratio of the pellet length to the cross-section diameter) of the pellets is preferably in the range of 0.1 to 20, and more preferably 0.2 to 15.

The thermoplastic resin used for the raw material of the fiber-reinforced thermoplastic resin is not limited to any particular type, and exemplary thermoplastic resins include polyolefins such as polyethylene and polypropylene; polyamides such as Nylon 6 and Nylon 66; and polyesters such as polyethylene terephthalate and polybutylene terephthalate.

The reinforcing fiber used for the raw material of the fiber-reinforced thermoplastic resin is not limited to any particular type, and exemplary reinforcing fibers include glass fibers, carbon fibers, steel fibers, and stainless steel fibers. Although the fiber length of the reinforcing fiber is not particularly limited, use of a fiber with a longer length is preferable since the screw of the present invention is capable of preventing the fiber breakage.

The molding method of the present invention is suitable for use in injection molding, injection compression molding, injection press molding, and gas-assisted molding and other injection moldings wherein plasticizing apparatus sharing common features may be utilized. The molding method of the present invention is also suitable for use in extrusion molding and blow molding. Use of the method of the present invention for injection moldings is most suitable since not only the fiber breakage and the clump formation but also bubble remaining in the molded article are prevented in the case of the injection molding and the resulting molded article may have a smooth outer surface. The method of the present invention is also applicable for use with an injection molding machine of plunger type wherein two or more screws are employed.

The fiber-reinforced thermoplastic resin may be plasticized under the following exemplary plasticization conditions:

Temperature: (melting point of the resin+20° C.) to (melting point of the resin+80° C.)
Injection speed: 10 to 100 mm/sec
Back pressure: less than 10 kgf/cm$^2$
Screw speed: 10 to 100 rpm Compared to the plasticizing apparatus of conventional type wherein the screw lead length is constant along the overall length of the screw and the screw channel depth gradually decreases in the compression section Sc, the plasticizing apparatus having mounted thereto the screw of the present invention is capable of preventing the fiber breakage as well as the clump formation due to the sufficient shear force attained without excessively increasing the screw channel depth. As a consequence, the present invention is capable of producing a molded article which has long residual fiber length as well as markedly improved mechanical strength in a convenient manner. Use of the screw of the present invention also enables to reduce the time required for the plasticization, and hence, to improve the productivity.

EXAMPLES

Next, the present invention is described in further detail by referring to Examples which by no means limit the scope of the present invention.

Examples 1 to 3

The molded articles obtained in the present invention were evaluated by the procedure as described below.

i. Length of residual fiber

Molded articles in the shape of a plate (200 mm×150 mm×4.5 mm, length×width×height) were prepared by injection molding, and a test piece of 40 mm×40 mm (length× width) was cut out from the center of the plate-shaped molded article. The test piece was subjected to combustion at 600° C. for 2 hours. Fiber length was measured for 300 fibers with a projector, and weight average fiber length was calculated by the following formula [9]:

$$\text{Weight average residual fiber length} = [\Sigma(W_i \times L_i)]/\Sigma(W_i) \qquad [9]$$

wherein $W_i$ is weight of the residual fiber, and $L_i$ is length of the residual fiber.

ii. Tensile test

The test was conducted in accordance with JIS K7054. In this test and in the tests as described below, the test pieces were cut out from the plate-shaped molded article obtained by the injection molding as described above.

iii. Flexural test

The test was conducted in accordance with JIS K7055.

iv. Izod impact test

The test was conducted in accordance with JIS K7110.

v. Plastication time

The time required in injection molding for obtaining an amount of the molten resin equal to the predetermined volume was measured.

vi. Appearance of the molded article

Plate-shaped molded articles of 200 mm×150 mm×4.5 mm (length×width×height) were observed by image analysis, and evaluated by the percentage of the clump area according to the following criteria:

good: percentage of the clump area is less than 5%
poor: percentage of the clump area is 5% or higher.

To the plasticizing apparatus shown in FIG. 4 adapted for use at a clampling force of 200 tons wherein the screw has a diameter D of 50 mm and the overall length of 1150 mm (L/D=23) and the screw reciprocating drive 8 is hydraulic were mounted a screw of the type wherein the screw lead length decreases along the overall length of the screw 1; a screw of the type wherein the screw lead length decreases in the compression section Sc and the metering section Sm; and a screw of the type wherein the screw lead length decreases in the feed section Sf and the compression section Sc, respectively. Specification of the screws employed are shown in Table 1.

Pellets of long fiber-reinforced thermoplastic resin having a pellet length of 9 mm and a reinforcing fiber length in the pellet of 9 mm prepared by mixing 40% by weight of glass fiber in polypropylene (melting point, 160° C.) were fed to the hopper 7. The screw was rotated for 30 seconds under the conditions of a cylinder temperature of 240° C. and a screw rotation speed of 50 rpm without mounting the screw head 3 and the cylinder head 4a, and the long fiber-reinforced thermoplastic resin ejected from the cylinder was sampled for 5 minutes. The sample was visually evaluated for the length of the residual fiber and for the presence of unmelted pellets. The results are shown in Table 1.

TABLE 1

| | Screw lead length (mm) Feed section, Lf | | | | | | | | | | | | | |
|---|---|---|---|---|---|---|---|---|---|---|---|---|---|---|
| Example | $Lf_1$ | $Lf_2$ | $Lf_3$ | $Lf_4$ | $Lf_5$ | $Lf_6$ | $Lf_7$ | $Lf_8$ | $Lf_9$ | $Lf_{10}$ | $Lf_{11}$ | $Lf_{12}$ | $Lf_{13}$ | $Lf_{14}$ |
| 1 | 45.0 | 44.5 | 44.1 | 43.6 | 43.1 | 42.7 | 42.2 | 41.7 | 41.3 | 40.8 | 40.4 | 39.9 | 39.4 | 39.0 |
| 2 | 45 | 45 | 45 | 45 | 45 | 45 | 45 | 45 | 45 | 45 | 45 | 45 | 45 | — |
| 3 | 45 | 44.4 | 43.8 | 43.2 | 42.6 | 42 | 41.4 | 40.8 | 40.2 | 39.6 | 39 | 38.4 | 37.8 | 37.2 |

| | Screw lead length (mm) | | | | | | | | | | | | | |
|---|---|---|---|---|---|---|---|---|---|---|---|---|---|---|
| | Compression section, Lc | | | | | | | | Metering section, Lm | | | | | |
| Example | $Lc_1$ | $Lc_2$ | $Lc_3$ | $Lc_4$ | $Lc_5$ | $Lc_6$ | $Lc_7$ | $Lc_8$ | $Lm_1$ | $Lm_2$ | $Lm_3$ | $Lm_4$ | $Lm_5$ | $Lm_6$ |
| 1 | 38.5 | 38.0 | 37.6 | 37.1 | 36.6 | 36.2 | 35.7 | 35.2 | 34.8 | 34.3 | 33.8 | 33.4 | 32.9 | 32.4 |
| 2 | 44.1 | 43.2 | 42.3 | 41.4 | 40.5 | 39.6 | 38.7 | — | 37.8 | 36.9 | 36 | 35.1 | 34.2 | 33.3 |
| 3 | 36.6 | 36 | 35.4 | 34.8 | 34.2 | 33.6 | 33 | 32.4 | 31.5 | 31.5 | 31.5 | 31.5 | 31.5 | 31.5 |

| | Screw lead length (mm) Metering section, Lm | | | | Length of residual fiber (mm) | Presence of unmelted pellets |
|---|---|---|---|---|---|---|
| Example | $Lm_7$ | $Lm_8$ | $Lm_9$ | $Lm_{10}$ | | |
| 1 | 32.0 | 31.5 | — | — | 7.64 | No |
| 2 | 32.4 | 31.5 | — | — | 8.02 | No |
| 3 | 31.5 | 31.5 | 31.5 | 31.5 | 7.81 | No |

Examples 4 to 6

To the plasticizing apparatus shown in FIG. 4 adapted for use at a clamping force of 200 tons wherein the screw has a diameter D of 50 mm and the overall length of 1150 mm (L/D=23) and the screw reciprocating drive 8 is hydraulic were mounted a screw of the type wherein the screw lead length Lm of the metering section Sm is increased in correspondence with the screw lead length Lm of the feed section Sf; a screw of the type wherein the screw lead length Lm of the metering section Sm is longer than the screw lead length Lm of the feed section Sf; and a screw of the type wherein the screw lead length Lm of the feed section Sf is reduced in correspondence with the screw lead length Lm of the metering section Sm, respectively. Specification of the screws employed are shown in Table 2.

Pellets of long fiber-reinforced thermoplastic resin having a pellet length of 9 mm and a reinforcing fiber length in the pellet of 9 mm prepared by mixing 40% by weight of glass fiber in polypropylene (melting point, 160° C.) were fed to the hopper 7. The screw was rotated for 30 seconds under the conditions of a cylinder temperature of 240° C. and a screw rotation speed of 50 rpm without mounting the screw head 3 and the cylinder head 4a, and the long fiber-reinforced thermoplastic resin ejected from the cylinder was sampled for 5 minutes. The sample was visually evaluated for the length of the residual fiber and for the presence of unmelted pellets. The results are shown in Table 2.

TABLE 2

| | Screw lead length (mm) | | | | | | | | | | Length of residual fiber (mm) | Presence of unmelted pellets |
|---|---|---|---|---|---|---|---|---|---|---|---|---|
| | Feed section, | Compression section, Lc | | | | | | | | Metering section, | | |
| Example | Lf | $Lc_1$ | $Lc_2$ | $Lc_3$ | $Lc_4$ | $Lc_5$ | $Lc_6$ | $Lc_7$ | $Lc_8$ | Lm | | |
| 4 | 45.0 | 43.5 | 42.0 | 40.5 | 39.0 | 37.5 | 36.0 | 34.5 | 33.0 | 45.0 | 7.93 | No |
| 5 | 31.5 | 43.5 | 42.0 | 40.5 | 39.0 | 37.5 | 36.0 | 34.5 | 33.0 | 45.0 | 7.65 | No |
| 6 | 31.5 | 43.5 | 42.0 | 40.5 | 39.0 | 37.5 | 36.0 | 34.5 | 33.0 | 31.5 | 7.60 | No |

Examples 7 to 27 and Comparative Examples 1 to 3

To the plasticizing apparatus shown in FIG. 4 adapted for use at a clampling force of 200 tons wherein the screw has a diameter D of 50 mm and the overall length of 1150 mm (L/D=23) and the screw reciprocating drive 8 is hydraulic were mounted a screw of the type having the screw geometry of FIG. 1 (Examples 7 to 16), a screw of the type having the screw geometry of FIG. 2 (Examples 17 to 27), and a screw of the type having the screw geometry of FIG. 3 (Comparative Examples 1 to 3). Specification of the screws employed are shown in Table 3.

TABLE 3-1(1)

| | | Screw channel depth (mm) | | | Screw lead length (mm) | | | | | | | | | |
|---|---|---|---|---|---|---|---|---|---|---|---|---|---|---|
| | | Feed section | Compression section | Metering section | Feed section | Compression section Lc | | | | | | | | |
| Example | Screw geometry | Hf[1] | Hc[2] | Hm[3] | Lf[4] | $Lc_1$ | $Lc_2$ | $Lc_3$ | $Lc_4$ | $Lc_5$ | $Lc_6$ | $Lc_7$ | $Lc_8$ | $Lc_9$ |
| 7 | FIG. 1 | 7.0 | 7.0* | 7.0 | 45.0 (0.90D) | 42.5 | 40.0 | 37.5 | 35.0 | 32.5 | 30.0 | 27.5 | 25.0 | 22.5 |
| 8 | FIG. 1 | 7.0 | 7.0* | 7.0 | 45.0 (0.90D) | 43.5 | 42.0 | 40.5 | 39.0 | 37.5 | 36.0 | 34.5 | 33.0 | — |
| 9 | FIG. 1 | 7.0 | 7.0* | 7.0 | 45.0 (0.90D) | 44.4 | 43.8 | 43.1 | 42.5 | 41.9 | 41.3 | 40.6 | — | — |
| 10 | FIG. 1 | 7.0 | 7.0* | 7.0 | 45.0 (0.90D) | 44.6 | 44.3 | 43.9 | 43.5 | 43.1 | 42.8 | 42.4 | — | — |
| 11 | FIG. 1 | 7.0 | 7.0* | 7.0 | 50.0 (1.00D) | 48.1 | 46.3 | 44.4 | 42.5 | 40.6 | 38.8 | 36.9 | — | — |
| 12 | FIG. 1 | 7.0 | 7.0* | 7.0 | 55.0 (1.10D) | 52.6 | 50.3 | 47.9 | 45.6 | 43.2 | 40.9 | — | — | — |
| 13 | FIG. 1 | 10.0 | 10.0* | 10.0 | 45.0 (0.90D) | 43.5 | 42.0 | 40.5 | 39.0 | 37.5 | 36.0 | 34.5 | 33.0 | — |
| 14 | FIG. 1 | 12.5 | 12.5* | 12.5 | 45.0 (0.90D) | 43.5 | 42.0 | 40.5 | 39.0 | 37.5 | 36.0 | 34.5 | 33.0 | — |
| 15 | FIG. 1 | 7.0 | 7.0* | 7.0 | 45.0 (0.90D) | 42.3 | 42.3 | 39.6 | 39.6 | 36.9 | 36.9 | 34.2 | 34.2 | — |
| 16 | FIG. 1 | 7.0 | 7.0* | 7.0 | 45.0 (0.90D) | 40.5 | 42.5 | 40.5 | 40.5 | 36.0 | 36.0 | 36.0 | 36.0 | — |

Note:
Screw full length (L) = 1150 mm
Screw diameter (D) = 50 mm
Ratio of the length of screw sections [Feed section:Compression section:Metering section] = 2:1:1
[1]Hf: screw channel depth of the feed section is constant.
[2]Hc: *screw channel depth of the compression section is constant. **screw channel depth of the compression section is decreased toward the metering section.
[3]Hm: screw channel depth of the metering section is constant.
[4]Lf: screw lead length of the feed section is constant.
[5]Lm: screw lead length of the metering section is constant.
Examples 1 to 10 [Screw geometry: FIG. 1];
Screw channel width Wf of the feed section: constant
Screw channel width $Wc_i$ of the compression section: decreased toward the metering section
Screw channel width Wf of the metering section: constant

TABLE 3-1(2)

| Example | Screw lead length (mm) Metering section $Lm^{5)}$ | Ratio of screw channel cross-sectional area Af/Am | Ratio of screw lead length Lf/Lm | Ratio of Screw channel depth Hf/Hm |
|---|---|---|---|---|
| 7 | 20.0 (0.40D) | 2.25 | 2.25 | 1 |
| 8 | 31.5 (0.63D) | 1.43 | 1.43 | 1 |
| 9 | 40.0 (0.80D) | 1.13 | 1.13 | 1 |
| 10 | 42.0 (0.84D) | 1.07 | 1.07 | 1 |
| 11 | 35.0 (0.70D) | 1.43 | 1.43 | 1 |
| 12 | 38.5 (0.77D) | 1.43 | 1.43 | 1 |
| 13 | 31.5 (0.63D) | 1.43 | 1.43 | 1 |
| 14 | 31.5 (0.63D) | 1.43 | 1.43 | 1 |
| 15 | 31.5 (0.63D) | 1.43 | 1.43 | 1 |
| 16 | 31.5 (0.63D) | 1.43 | 1.43 | 1 |

TABLE 3-2(1)

| | | Screw channel depth (mm) | | | Screw lead length (mm) | | | | | | | | | |
|---|---|---|---|---|---|---|---|---|---|---|---|---|---|---|
| | | Feed section | Compression section | Metering section | Feed section | Compression section Lc | | | | | | | | |
| Example | Screw geometry | Hf[1] | Hc[2] | Hm[3] | Lf[4] | $Lc_1$ | $Lc_2$ | $Lc_3$ | $Lc_4$ | $Lc_5$ | $Lc_6$ | $Lc_7$ | $Lc_8$ | $Lc_9$ |
| 17 | FIG. 2 | 12.5 | ** | 8.9 | 45.0 (0.90D) | 42.5 | 40.0 | 37.5 | 35.0 | 32.5 | 30.0 | 27.5 | 25.0 | 22.5 |
| 18 | FIG. 2 | 12.5 | ** | 8.9 | 45.0 (0.90D) | 43.5 | 42.0 | 40.5 | 39.0 | 37.5 | 36.0 | 34.5 | 33.0 | — |
| 19 | FIG. 2 | 12.5 | ** | 8.9 | 45.0 (0.90D) | 44.0 | 43.0 | 42.0 | 41.0 | 40.0 | 39.0 | 38.0 | — | — |
| 20 | FIG. 2 | 12.5 | ** | 8.9 | 45.0 (0.90D) | 44.4 | 43.8 | 43.1 | 42.5 | 41.9 | 41.3 | 40.6 | — | — |
| 21 | FIG. 2 | 12.5 | ** | 8.9 | 45.0 (0.90D) | 44.6 | 44.3 | 43.9 | 43.5 | 43.1 | 42.8 | 42.4 | — | — |
| 22 | FIG. 2 | 12.5 | ** | 8.9 | 50.0 (1.00D) | 48.1 | 46.3 | 44.4 | 42.5 | 40.6 | 38.8 | 36.6 | — | — |
| 23 | FIG. 2 | 12.5 | ** | 8.9 | 55.0 (1.10D) | 52.6 | 50.3 | 47.9 | 45.6 | 43.2 | 40.9 | — | — | — |
| 24 | FIG. 2 | 10.0 | ** | 7.0 | 45.0 (0.90D) | 44.0 | 43.0 | 42.0 | 41.0 | 40.0 | 39.0 | 38.0 | — | — |
| 25 | FIG. 2 | 7.0 | ** | 5.0 | 45.0 (0.90D) | 44.0 | 43.0 | 42.0 | 41.0 | 40.0 | 39.0 | 38.0 | — | — |

TABLE 3-2(1)-continued

| | | Screw channel depth (mm) | | | Screw lead length (mm) | | | | | | | | | |
| | | Feed section | Compression section | Metering section | Feed section | Compression section Lc | | | | | | | | |
| Example | Screw geometry | Hf[1] | Hc[2] | Hm[3] | Lf[4] | Lc$_1$ | Lc$_2$ | Lc$_3$ | Lc$_4$ | Lc$_5$ | Lc$_6$ | Lc$_7$ | Lc$_8$ | Lc$_9$ |
|---|---|---|---|---|---|---|---|---|---|---|---|---|---|---|
| 26 | FIG. 2 | 12.5 | ** | 8.9 | 45.0 (0.90D) | 42.3 | 42.3 | 39.6 | 39.6 | 36.9 | 36.9 | 34.2 | 31.5 | — |
| 27 | FIG. 2 | 12.5 | ** | 8.9 | 45.0 (0.90D) | 40.5 | 40.5 | 40.5 | 36.0 | 36.0 | 36.0 | 36.0 | 36.0 | — |

Note:
Screw full length (L) = 1150 mm
Screw diameter (D) = 50 mm
Ratio of the length of screw sections [Feed section:Compression section:Metering section] = 2:1:1
[1]Hf: screw channel depth of the feed section is constant.
[2]Hc: **screw channel depth of the compression section is decreased toward the metering section.
[3]Hm: screw channel depth of the metering section is constant.
[4]Lf: screw lead length of the feed section is constant.
[5]Lm: screw lead length of the metering section is constant.
Examples 11 to 21 [Screw geometry: FIG. 2];
Screw channel width Wf of the feed section: constant
Screw channel width Wc$_i$ of the compression section: decreased toward the metering section
Screw channel width Wf of the metering section: constant

TABLE 3-2(2)

| Example | Screw lead length (mm) Metering section Lm[5] | Ratio of screw channel cross-sectional area Af/Am | Ratio of screw lead length Lf/Lm | Ratio of Screw channel depth Hf/Hm |
|---|---|---|---|---|
| 17 | 20.0 (0.40D) | 3.15 | 2.25 | 1.4 |
| 18 | 31.5 (0.63D) | 2.00 | 1.43 | 1.4 |
| 19 | 37.0 (0.74D) | 1.70 | 1.22 | 1.4 |
| 20 | 40.0 (0.80D) | 1.58 | 1.13 | 1.4 |
| 21 | 42.0 (0.84D) | 1.50 | 1.07 | 1.4 |
| 22 | 35.0 (0.70D) | 2.00 | 1.43 | 1.4 |

TABLE 3-2(2)-continued

| Example | Screw lead length (mm) Metering section Lm[5] | Ratio of screw channel cross-sectional area Af/Am | Ratio of screw lead length Lf/Lm | Ratio of Screw channel depth Hf/Hm |
|---|---|---|---|---|
| 23 | 38.5 (0.77D) | 2.00 | 1.43 | 1.4 |
| 24 | 37.0 (0.74D) | 1.71 | 1.22 | 1.4 |
| 25 | 37.0 (0.74D) | 1.71 | 1.22 | 1.4 |
| 26 | 31.5 (0.63D) | 2.00 | 1.43 | 1.4 |
| 27 | 31.5 (0.63D) | 2.00 | 1.43 | 1.4 |

TABLE 3-3(1)

| | | Screw channel depth (mm) | | | Screw lead length (mm) | | | | | | | | | |
| | | Feed section | Compression section | Metering section | Feed section | Compression section Lc | | | | | | | | |
| Comparative Example | Screw geometry | Hf[1] | Hc[2] | Hm[3] | Lf[4] | Lc$_1$ | Lc$_2$ | Lc$_3$ | Lc$_4$ | Lc$_5$ | Lc$_6$ | Lc$_7$ | Lc$_8$ | Lc$_9$ |
|---|---|---|---|---|---|---|---|---|---|---|---|---|---|---|
| 1 | FIG. 3 | 7.0 | ** | 2.5 | 45.0 (0.90D) | 45.0 | 45.0 | 45.0 | 45.0 | 45.0 | 45.0 | 45.0 | — | |
| 2 | FIG. 3 | 7.0 | 7.0* | 7.0 | 45.0 (0.90D) | 45.0 | 45.0 | 45.0 | 45.0 | 45.0 | 45.0 | 45.0 | — | |
| 3 | FIG. 3 | 12.5 | 7.0* | 8.9 | 45.0 (0.90D) | 45.0 | 45.0 | 45.0 | 45.0 | 45.0 | 45.0 | 45.0 | — | |

Note:
Screw full length (L) = 1150 mm
Screw diameter (D) = 50 mm
Ratio of the length of screw sections [Feed section:Compression section:Metering section] = 2:1:1
[1]Hf: screw channel depth of the feed section is constant.
[2]Hc: *screw channel depth of the compression section is constant. **screw channel depth of the compression section is decreased toward the metering section.
[3]Hm: screw channel depth of the metering section is constant.
[4]Lf: screw lead length of the feed section is constant.
[5]Lm: screw lead length of the metering section is constant.
Examples 1 to 3 [Screw geometry: FIG. 3];
Screw channel width Wf of the feed section: constant
Screw channel width Wc$_i$ of the compression section: decreased toward the metering section
Screw channel width Wf of the metering section: constant

TABLE 3-3(2)

| Comparative Example | Screw lead length (mm) Metering section Lm[5] | Ratio of screw channel cross-sectional area Af/Am | Ratio of screw lead length Lf/Lm | Ratio of Screw channel depth Hf/Hm |
|---|---|---|---|---|
| 1 | 45.0 (0.90D) | 2.80 | 1.00 | 2.8 |
| 2 | 45.0 (0.90D) | 1.00 | 1.00 | 1.0 |
| 3 | 45.0 (0.90D) | 1.40 | 1.00 | 1.4 |

Pellets of long fiber-reinforced thermoplastic resin having a pellet length of 9 mm and a reinforcing fiber length in the pellet of 9 mm prepared by mixing 40% by weight of glass fiber in polypropylene (melting point, 160° C.) were fed to the hopper 7. The screw was rotated for 30 seconds under the conditions of a cylinder temperature of 240° C. and a screw rotation speed of 50 rpm without mounting the screw head 3 and the cylinder head 4a, and the long fiber-reinforced thermoplastic resin ejected from the cylinder was sampled for 5 seconds. The sample was visually evaluated for the length of the residual fiber and for the presence of unmelted pellets. The results are shown in Table 4.

TABLE 4

| | Length of residual fiber (mm) | Presence of unmelted pellet |
|---|---|---|
| Example 7 | 6.34 | No |
| Example 8 | 7.77 | No |
| Example 9 | 8.37 | No |
| Example 10 | 8.08 | No |
| Example 11 | 8.24 | No |
| Example 12 | 8.37 | No |
| Example 13 | 8.29 | No |
| Example 14 | 8.28 | No |
| Example 15 | 7.68 | No |
| Example 16 | 8.21 | No |
| Example 17 | 8.02 | No |
| Example 18 | 7.69 | No |
| Example 19 | 8.63 | No |
| Example 20 | 8.48 | No |
| Example 21 | 8.30 | No |
| Example 22 | 8.33 | No |
| Example 23 | 8.30 | No |
| Example 24 | 8.12 | No |
| Example 25 | 7.83 | No |
| Example 26 | 8.41 | No |
| Example 27 | 7.89 | No |
| Comparative Example 1 | 3.53 | No |
| Comparative Example 2 | 8.20 | Yes |
| Comparative Example 3 | 8.53 | Yes |

Next, after mounting the screw head 3 and the cylinder head 4a, and then the mold, plate-shaped molded article was produced by injection molding.

The screws employed in Examples 7 to 16 were of the type shown in FIG. 1, and the screws employed in Examples 17 to 27 were of the type shown in FIG. 2. In both types of the screws, screw channel width Wf of the feed section Sf was constant, screw channel width $Wc_i$ of the compression section Sc was decreased toward the metering section; and screw channel width Wm of the metering section Sm was constant. The screws employed in Comparative Examples 1 to 3 were of the type shown in FIG. 3 wherein screw channel width Wf of the feed section Sf was constant, screw channel width $Wc_i$ of the compression section Sc was constant; and screw channel width Wm of the metering section Sm was constant. These screws were of the type the same as the one described in JP-A 2-292008.

The screws of the present invention were capable of fully plasticizing the pellets while retaining the residual fiber length at sufficient level, and such effects were prominent when the ratio Lf/Lm of the screw lead length Lf of the feed section Sf to the screw lead length Lm of the feed section Sm was 1.07 or higher, and even more prominent when Lf/Lm was 1.13 or higher. In addition, no clumps were observed.

Examples 28 and 29, and Comparative Examples 4 and 5

To the plasticizing apparatus shown in FIG. 5 adapted for use at a clampling force of 200 tons wherein the screw has a diameter D of 50 mm and the overall length of 1150 mm (L/D=23) and the screw reciprocating drive 8 is hydraulic were mounted a screw of the type having the screw geometry of FIG. 1 and the specification of Example 8 or 10, and a screw of the type having the screw geometry of FIG. 3 and the specification of Comparative Example 1 or 3, respectively.

Pellets of long fiber-reinforced thermoplastic resin having a pellet length of 9 mm and a reinforcing fiber length in the pellet of 9 mm prepared by mixing 40% by weight of glass fiber in polypropylene (melting point, 160° C.) were fed to the hopper 7. The pellets were plasticized under the conditions including a cylinder temperature of 240° C., a screw rotation speed of 50 rpm and a back pressure of 0 kgf/cm$^2$, and plate-shaped molded article was molded at an injection speed of 30 mm/sec. The resulting molded article was evaluated for the length of the residual fibers, the presence of the clumps, and the mechanical properties. The results are shown in Table 5.

TABLE 5

| | Ex. 28 | Ex. 29 | Comp. Ex. 4 | Comp. Ex. 5 |
|---|---|---|---|---|
| Screw used | Screw of Ex. 8 | Screw of Ex. 10 | Screw of Comp. Ex. 1 | Screw of Comp. Ex. 3 |
| Length of the residual fiber | 3.9 | 3.6 | 1.4 | 3.2 |
| Appearance of the molded article | Good | Good | Good | Poor |
| Tensile strength (kgf/cm$^2$) | 890 | 860 | 760 | 860 |
| Flexural strength (kgf/cm$^2$) | 1610 | 1570 | 1100 | 1450 |
| Izod Impact Strength (kfg · cm/cm$^2$) | 34.6 | 32.7 | 18.0 | 29.3 |
| Plasticization time (sec) | 10.3 | 11.4 | 19.8 | 9.3 |

When the plasticizing screw of the present invention is used, fibers are prevented from breakage and clump formation is also avoided since sufficient shearing force is obtained without excessively increasing the depth of the screw channels. Therefore, the length of the reinforcing fibers in the molded article is maintained at a sufficient level to realize markedly high mechanical properties, and in particular, excellent izod impact strength. The short plasticization time also enables production at a higher productivity.

INDUSTRIAL UTILITY

The article molded from the fiber-reinforced thermoplastic resin produced in the present invention has a long residual fiber length of more than about 2 mm, and exhibits excellent mechanical properties, and in particular, excellent izod impact strength. Therefore, the molded article of the present invention is quite suitable for various automobile parts such as bumper beam and front end as well as machine parts where high mechanical strength is required.

What is claimed is:

1. A method for molding a fiber-reinforced thermoplastic resin, comprising injecting into a mold a fiber-reinforced thermoplastic resin which has been plasticized by a plasticizing apparatus for molding having a screw (1), a screw head (3), a cylinder (4), and a cylinder head (4a) surrounding the screw (1) and the screw head (3), a nozzle (6) attached to a forward end of the cylinder head (4a), a heater (5) mounted to the cylinder (4), a hopper (7), and a screw reciprocating drive (8); wherein the screw (1) comprises a feed section (Sf) for heating and conveying the fiber-reinforced thermoplastic resin, a compression section (Sc) for melting and kneading the heated resin conveyed from the feed section (Sf), and a metering section (Sm) for conveying the melt-kneaded resin conveyed from the compression section (Sc) to the nozzle (6), and wherein a screw lead length $Lc_i$ of the compression section (Sc) decreases in a direction toward a forward end of the screw.

2. A molded article prepared by molding a fiber-reinforced thermoplastic resin by injecting into a mold a fiber-reinforced thermoplastic resin which has been plasticized by a plasticizing apparatus for molding having a screw (1), a screw head (3), a cylinder (4), and a cylinder head (4a) surrounding the screw (1) and the screw head (3), a nozzle (6) attached to a forward end of the cylinder head (4a), a heater (5) mounted to the cylinder (4), a hopper (7), and a screw reciprocating drive (8); wherein the screw (1) comprises a feed section (Sf) for heating and conveying the fiber-reinforced thermoplastic resin, a compression section (Sc) for melting and kneading the heated resin conveyed from the feed section (Sf), and a metering section (Sm) for conveying the melt-kneaded resin conveyed from the compression section (Sc) to the nozzle (6), and wherein a screw lead length $Lc_i$ of the compression section (Sc) decreases in a direction toward a forward end of the screw.

3. A screw for plasticizing a fiber-reinforced thermoplastic resin, comprising a feed section (Sf) for heating and conveying the fiber-reinforced thermoplastic resin, a compression section (Sc) for melting and kneading the heated resin conveyed from the feed section (Sf), and a metering section (Sm) for conveying the melt-kneaded resin conveyed from the compression section (Sc) to a nozzle (6), characterized in that a screw lead length $Lc_i$ of the compression section (Sc) decreases in a direction toward a forward end of the screw.

4. The screw for plasticizing a fiber-reinforced thermoplastic resin according to claim 3 characterized in that said screw satisfies a following relation (I):

$$\text{screw lead length (Lm) of the metering section (Sm)} < \text{screw lead length (Lf) of the feed section (Sf)} \quad \text{(I)}.$$

5. The screw for plasticizing a fiber-reinforced thermoplastic resin according to claim 3 characterized in that said screw satisfies following relations (II) and (III), and a ratio of a screw channel cross-sectional area (Af) of the feed section (Sf) to a screw channel cross-sectional area (Am) of the metering section (Sm) satisfies a following relation (IV):

$$0.9D \leq \text{screw lead length (Lf) of the feed section (Sf)} \leq 1.1\,D \quad \text{(II)}$$

$$0.4D \leq \text{screw lead length (Lm) of the metering section (Sm)} < 1.1D \quad \text{(III)}$$

$$1 < \text{(the screw channel cross-sectional area (Af) of the feed section (Sf))/(the screw channel cross-sectional area (Am) of the metering section (Sm))} \leq 2.5 \quad \text{(IV)}$$

wherein D is screw diameter; (Af) is an average of an area represented by multiplying screw channel depth (Hf) of the feed section (Sf), by screw channel width (Wf) of the feed section (Sf); and (Am) is an average of an area represented by multiplying screw channel depth (Hm) of the feed section (Sm), by screw channel width (Wm) of the metering section (Sm).

6. An apparatus for plasticizing a fiber-reinforced thermoplastic resin, characterized in that said plasticizing apparatus has the screw (1) according to claim 3, a screw head (3), a cylinder (4) and a cylinder head (4a) surrounding the screw (1) and the screw head (3), a nozzle (6) attached to a forward end of the cylinder head (4a), a heater (5) mounted to the cylinder (4), a hopper (7), and a screw reciprocating drive (8).

* * * * *